(12) United States Patent
Ramamurti et al.

(10) Patent No.: US 11,270,084 B2
(45) Date of Patent: Mar. 8, 2022

(54) SYSTEMS AND METHODS FOR USING TRIGGER WORDS TO GENERATE HUMAN-LIKE RESPONSES IN VIRTUAL ASSISTANTS

(71) Applicant: Johnson Controls Tyco IP Holdings LLP, Milwaukee, WI (US)

(72) Inventors: Viswanath Ramamurti, San Leandro, CA (US); Young M. Lee, Old Westbury, NY (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 51 days.

(21) Appl. No.: 16/159,199

(22) Filed: Oct. 12, 2018

(65) Prior Publication Data
US 2020/0117717 A1    Apr. 16, 2020

(51) Int. Cl.
*G06F 40/56*    (2020.01)
*G10L 15/22*    (2006.01)
*G10L 15/16*    (2006.01)
*G10L 15/18*    (2013.01)
(Continued)

(52) U.S. Cl.
CPC .............. *G06F 40/56* (2020.01); *G10L 15/16* (2013.01); *G10L 15/1822* (2013.01); *G10L 15/22* (2013.01); *G06F 3/167* (2013.01); *G10L 2015/088* (2013.01); *G10L 2015/223* (2013.01)

(58) Field of Classification Search
CPC ...... G06F 40/30; G06F 40/216; G06F 40/289; G06F 40/279; G06F 40/56; G06F 16/248; G06F 40/35; G06F 16/3329; G06F 16/3347; G06F 40/00; G06F 40/20; G06F 40/205; G06F 16/243; G06F 16/3338; G06F 16/3344; G06F 16/345; G06F 16/5866; G06F 16/68; G06F 16/683; G06F 16/95; G06F 3/167; G06F 3/16; G06F 40/284; G06F 40/44; G06F 40/268; G10L 15/16; G10L 25/30; G10L 15/1815; G10L 15/18; G10L 15/14; G10L 15/1822; G10L 17/02; G10L 17/18; G10L 2015/227; G10L 2015/228; G10L 15/22; G10L 2015/088;
(Continued)

(56) References Cited

U.S. PATENT DOCUMENTS 9,890,971 B2    2/2018    Ribbich et al.
9,971,453 B2    5/2018    Alberth, Jr.
10,020,956 B2   7/2018    Alberth, Jr.
(Continued)

OTHER PUBLICATIONS

U.S. Appl. No. 15/951,761, filed Apr. 12, 2018, Johnson Controls Technology Company.
(Continued)

*Primary Examiner* — Huyen X Vo
(74) *Attorney, Agent, or Firm* — Foley & Lardner LLP (57) ABSTRACT

A method for generating a human-like response to a voice or text command includes receiving an input sequence of words and processing the input sequence of words to generate a trigger word that is indicative of a desired nature of the human-like response. The method further includes encoding a neural network using the trigger word and generating the human-like response using an output of the neural network. The method enables implementation of voice command functionality in various types of devices with only a small amount of training data.

21 Claims, 7 Drawing Sheets

(51) Int. Cl.
*G10L 15/08* (2006.01)
*G06F 3/16* (2006.01)

(58) Field of Classification Search
CPC . G10L 15/08; G10L 2015/223; G10L 13/027; G10L 13/08
See application file for complete search history.

(56) References Cited

U.S. PATENT DOCUMENTS

| | | | |
|---|---|---|---|
| 10,387,888 B2* | 8/2019 | Sapoznik | H04L 67/306 |
| 2016/0140435 A1* | 5/2016 | Bengio | G06F 40/40 |
| | | | 382/158 |
| 2018/0182376 A1* | 6/2018 | Vangysel | G10L 21/10 |
| 2018/0260856 A1* | 9/2018 | Balasubramanian | |
| | | | G06Q 30/0269 |
| 2018/0285348 A1* | 10/2018 | Shu | G06F 40/35 |
| 2018/0331839 A1* | 11/2018 | Gao | G06Q 10/107 |
| 2018/0336183 A1* | 11/2018 | Lee | G06F 40/30 |
| 2019/0172466 A1* | 6/2019 | Lee | G06N 3/084 |
| 2019/0189115 A1* | 6/2019 | Hori | G10L 15/16 |
| 2019/0196952 A1* | 6/2019 | Manchiraju | G06N 3/088 |
| 2019/0222540 A1* | 7/2019 | Relangi | G06Q 10/10 |
| 2019/0273701 A1* | 9/2019 | Basheer | G06F 16/951 |
| 2019/0355043 A1* | 11/2019 | Swierk | G06N 5/02 |
| 2020/0019370 A1* | 1/2020 | Doggett | G10L 13/043 |
| 2020/0058299 A1* | 2/2020 | Lee | G10L 15/1815 |
| 2020/0327327 A1* | 10/2020 | Wu | G06F 16/5866 |

OTHER PUBLICATIONS

U.S. Appl. No. 15/951,790, filed Apr. 12, 2018, Johnson Controls Technology Company.
U.S. Appl. No. 15/951,842, filed Apr. 12, 2018, Johnson Controls Technology Company.
Goodman, A bit of progress in language modeling, Computer Speech and Language, 2001, 32 pages.
Jozefowicz et al., Exploring the limits of language modeling, Feb. 11, 2016, 11 pages.
Mikolov et al., Efficient Estimation of Word Representations in Vector Space, Sep. 7, 2013, 12 pages.
Nallapati et al., Abstractive Text Summarization Using Sequence-to-Sequence RNNs and Beyond, Aug. 26, 2016, 12 pages.
Neubig, Neural Machine Translation and Sequence-to-sequence Models: A Tutorial, Mar. 5, 2017, 65 pages.
Pennington et al., GloVe: Global Vectors for Word Representation, 2014, 12 pages.
Rivera-Soto et al., Sequence to Sequence Models for Generating Video Captions, 2017, 7 pages.
Sutskever et al., Sequence to Sequence Learning with Neural Networks, Dec. 14, 2014, 9 pages.
Xu et al., Show, Attend and Tell: Neural Image Caption Generation with Visual Attention, Apr. 19, 2016, 22 pages.

* cited by examiner

| Input Sequence ⌐130 | Trigger Word ⌐340 |
|---|---|
| The bathroom looks great. | Great |
| The toilet is dirty. | Dirty |
| We are out of milk. | Empty |
| I feel cold. | Cold |
| I am going for a walk. | Default |

FIG. 7

US 11,270,084 B2

SYSTEMS AND METHODS FOR USING TRIGGER WORDS TO GENERATE HUMAN-LIKE RESPONSES IN VIRTUAL ASSISTANTS

BACKGROUND

The present disclosure relates generally to machine learning and artificial intelligence and more particularly to neural networks used for language processing applications. A variety of modern electronic devices (e.g. smartphones, personal computers, laptops, tablets, gaming systems, and sound systems) include virtual assistants (i.e. software agents) that can interact with users in unique and expanding ways. For example, a smartphone user can retrieve directions to the nearest gas station by interacting with a virtual assistant running on the smartphone. The virtual assistant can recognize voice inputs received from the user, provide feedback to the user, and execute commands accordingly.

Neural networks are often used to perform language processing functions as described above. In general, a neural network can be trained with historical data in order to "learn" about different inputs it receives and how to translate those inputs into appropriate outputs. However, the accuracy and effectiveness of the neural network can be heavily dependent on the quantity of training data it has been exposed to. Systems and methods that could effectively train a neural network without a large quantity of training data would be desired.

SUMMARY

One implementation of the present disclosure is a method for generating a human-like response to a voice or text input. The method includes receiving an input sequence of words and processing the input sequence of words to generate a trigger word that is indicative of a desired nature of the human-like response. The method further includes encoding a neural network using the trigger word and generating the human-like response using an output of the neural network.

Another implementation of the present disclosure is a system including a cloud computing platform and a device with an integrated virtual assistant and in communication with the cloud computing platform. The device is configured to receive an input sequence of words spoken by a human and transmit the input sequence of words to the cloud computing platform. The cloud computing platform is configured to extract a trigger word from the input sequence of words that is indicative of a desired nature of an output response to be transmitted to the human, provide the trigger word as an input to a neural network, and generate the output response using an output the neural network. The device is further configured to receive the output response from the cloud computing platform and provide the output response to the human.

Yet another implementation of the present disclosure is a method for providing a response to a speech input. The method includes receiving, by a device with an integrated virtual assistant, the speech input from a human and transmitting, by the device, the speech input to a cloud computing platform. The method further includes extracting, by the cloud computing platform, a trigger word from the speech input that is indicative of a desired nature of the response, providing, by the cloud computing platform, the trigger word as an input to a neural network, and generating, by the cloud computing platform, the response using the neural network. The method further includes receiving, by the device, the response from the cloud computing platform and providing, by the device, the response to the human.

Those skilled in the art will appreciate this summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, systems and methods for language processing using trigger words are shown, according to various embodiments. The systems and methods described herein allow entities with an insignificant amount of training data to implement reasonable voice command functionality in new systems or devices. For example, some entities with large amounts of training data can deploy advanced sequence to sequence neural network models that can effectively translate a full input sequence (e.g. a sentence in French) to a full output sequence (e.g. a sentence in English). However, such a sequence to sequence model can be ineffective in the absence of sufficient training data. The present disclosure describes a method of extracting a single trigger word from an input sequence that is indicative of the desired nature of an output sequence. As a result, a neural network can be trained with a small set of trigger word—output response pairs in order to generate reasonable responses to inputs.

Figure 1:
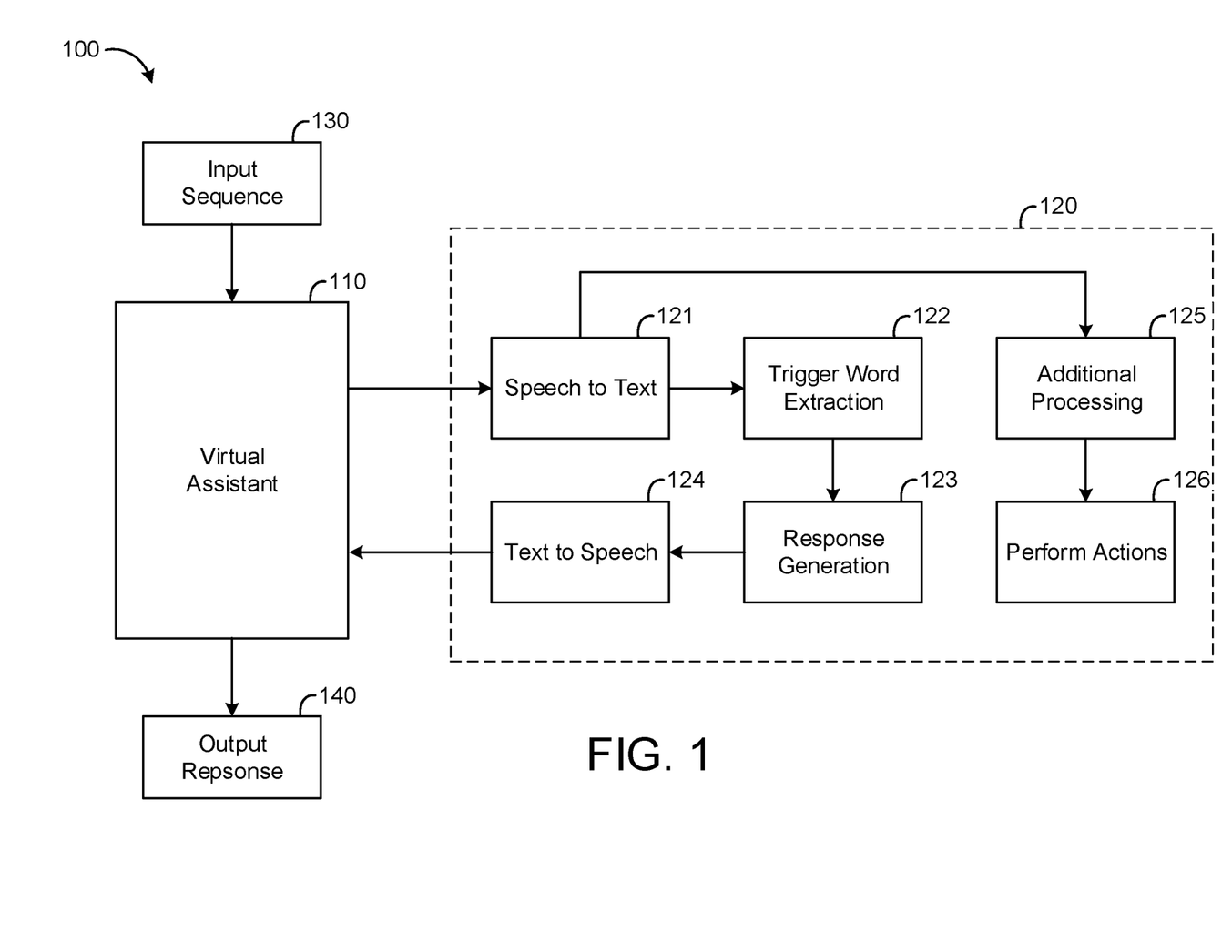
FIG. 1 is a block diagram of an example system for language processing, according to some embodiments.

Referring now to FIG. 1, an example system 100 for language processing is shown, according to some embodiments. System 100 is shown to include a virtual assistant 110 that can be configured to receive an input sequence of words 130 and generate an output response 140. In order to perform language processing, virtual assistant 110 can be configured to transmit data to and receive data from a cloud computing platform 120. Cloud computing platform 120 can include one or more servers configured to store data and execute a variety of different applications and modules.

Those of ordinary skill in the art will appreciate that virtual assistant 110 can be implemented in a variety of electronic devices and systems. For example, virtual assistant 110 can be implemented in smartphones, watches, tablets, speakers, laptops, personal computers, cars, operating systems, web applications (e.g. social media and other websites), and mobile applications (e.g. navigation, music, messaging, food ordering, ride sharing). For the remainder of this disclosure, an example implementation of virtual assistant 110 in a smart thermostat device will be described in detail.

Figure 2:
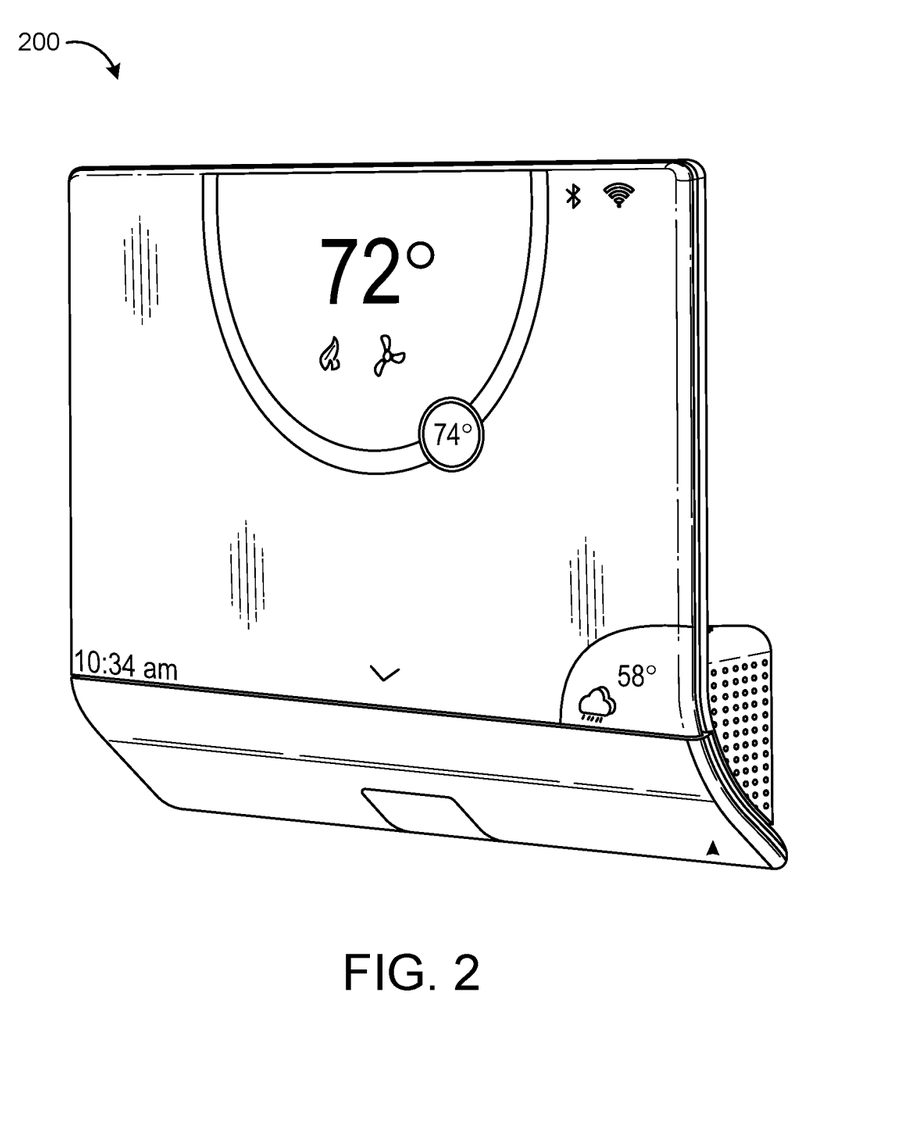
FIG. 2 is a drawing of an example smart thermostat device, according to some embodiments.

Referring now to FIG. 2, an example smart thermostat device 200 is shown, according to some embodiments. Thermostat device 200 can be installed in both commercial and residential buildings and can be integrated with a larger building management system (BMS). In some embodiments, thermostat device 200 is a GLAS smart thermostat as produced by Johnson Controls. Various implementations of thermostat device 200 are described in detail in U.S. Pat. Nos. 9,890,971, 9,971,453, 10,020,956, U.S. patent application Ser. No. 15/951,790, U.S. patent application Ser. No. 5/951,761, and U.S. patent application Ser. No. 15/951,842. Each of these patents and patent applications is incorporated by reference herein.

As an overview, thermostat device 200 is configured to control building equipment, receive input from users, and provide feedback to users. For example, thermostat device 200 can directly or indirectly control building equipment such as fans, air handling units (AHUs), rooftop units (RTUs), variable air volume units or assemblies (VAVs), chillers, boilers, variable refrigerant flow systems (VRFs), indoor/outdoor air conditioning units, lighting, security systems, fire systems, air filters, etc. Thermostat device 200 can receive inputs such as temperature setpoint changes and provide feedback such as air filter recommendations and outside air temperatures. Thermostat device 200 can be wirelessly connected to the Internet (e.g. via Wi-Fi) and other electronic networks and can be operated using a mobile application (e.g. smartphone application). Thermostat device 200 provides users with an elegant and user-friendly device with improved functionality over pervious thermostats. Part of this improved functionality is the integration of virtual assistant 110. Virtual assistant 110 can be implemented in a variety of ways including integration with third-party platforms (e.g. Microsoft Cortana, Amazon Alexa, Google Assistant, etc.).

Referring back to FIG. 1, input sequence 130 can be any type of command or statement spoken by a user (i.e. a human) and detected by thermostat device 200. Input sequence 130 can also be received in the form of text (e.g. SMS message, email message, etc.). For example, a user can interact with thermostat device 200 through voice commands in order to perform functions such as changing a temperature setpoint, changing a mode (e.g. auto, heat, cool, off), changing a state (e.g. home, away, sleep, vacation), or turning a fan on or off. Users can also request traffic information, weather information, and directions in addition to setting alarms, reminders, or timers and creating or editing a schedule or calendar. Input sequence 130 can include any number of words and can be a complete sentence or a phrase. Similar approaches can also be applied to cases where the input is an image instead of speech or text.

Output response 140 can be any type of response generated by thermostat device 200 and communicated to a user (e.g. through speakers). Output response 140 should be related to input sequence 130. Moreover, output response 140 should not be the same exact response every time a similar input sequence 130 is received. Machine learning and artificial intelligence models such as neural networks can be used to deliver this functionality.

Cloud computing platform 120 is shown to include various example applications or modules that can be configured to perform various functions. For example, platform 120 is shown to include both a speech to text module 121 and a text to speech module 124. Module 121 can be configured to convert input sequence 130 from speech to text (e.g. a string or string array). This conversion enables more efficient processing of input sequence 130 in order to generate an appropriate output response 140. After output response 140 is determined, module 124 can be configured to convert the output response into a speech format that can be used by virtual assistant 110 in order to provide a human-like response to the user. In some embodiments, modules 121 and 124 use a third-party API (e.g. IBM Watson, Microsoft Azure, Google Cloud, etc.).

Cloud computing platform 120 is also shown to include a trigger word extraction module 122. Module 122 can be implemented in a variety of ways including using a rule-based system. Module 122 can be configured to analyze input sequence 130 in order to determine a single trigger word that is indicative of the desired nature of output response 140. Examples of trigger words and associated input sequences are described in more detail below with respect to FIG. 3. An example implementation of module 122 as a rule-based system that generates a hidden state encoding of a recurrent neural network is also described below with respect to FIG. 5.

Cloud computing platform 120 is also shown to include a response generation module 123. Module 123 can be implemented in a variety of ways including using a recurrent neural network. Module 123 can be configured to analyze an input trigger word in order to determine an appropriate output response 140. Examples of trigger words and associated output responses are described in more detail below with respect to FIG. 4. An example implementation of module 123 as a recurrent neural network is also described below with respect to FIG. 5.

Cloud computing platform 120 is also shown to include an additional processing module 125 and a task performance module 126. Module 125 can be configured to analyze input sequence 130 in order to determine if any appropriate actions should be taken and what those actions should be. In some embodiments, module 125 also analyzes trigger words and output responses to determine additional actions that may be taken. For example, if input sequence 130 is "it is cold in here," module 125 can be configured to determine that a temperature setpoint should be increased. As another example, if input sequence 130 is "we are out of coffee," module 125 can be configured to determine that an alert should be generated and associated with a break room. In some cases, additional processing may not be necessary. Module 126 can be configured to initiate and/or perform such actions. For example, module 126 can be configured to interact with a building management system in order to send an alert to maintenance personnel to restock coffee in the break room or change a temperature setpoint associated with thermostat device 200.

Figure 3:
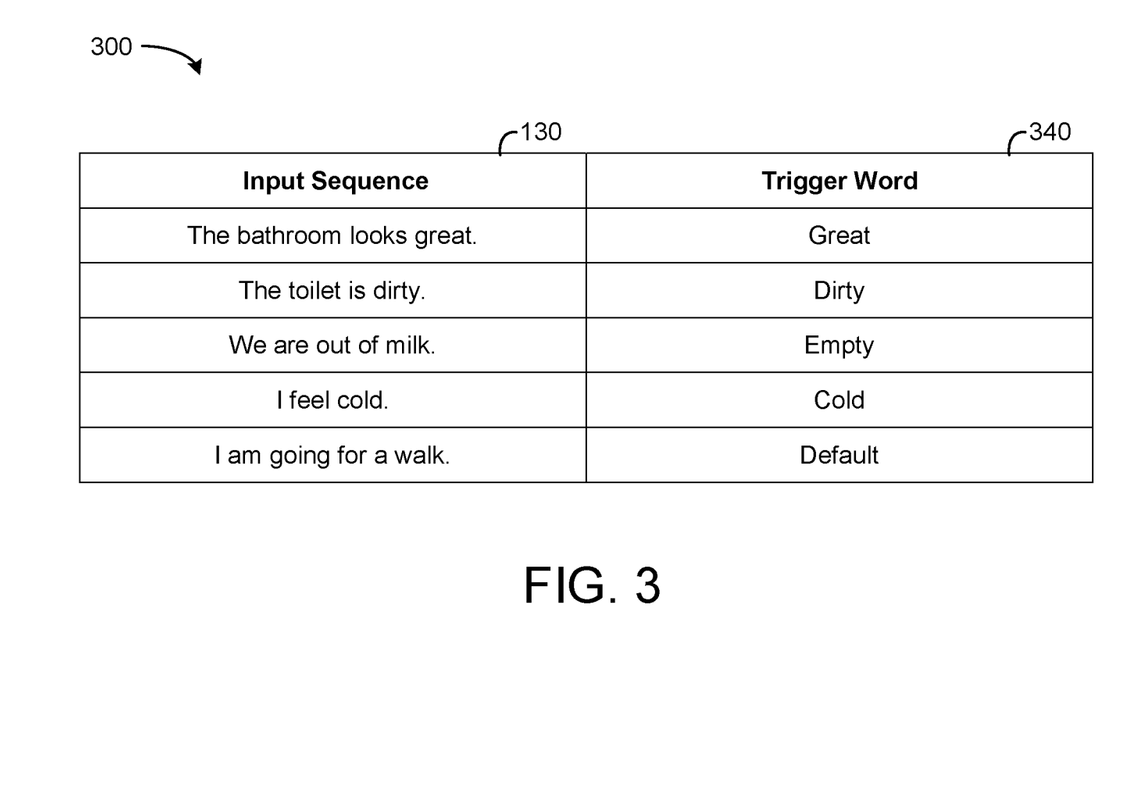
FIG. 3 is a table showing examples of input sequence—trigger word pairs, according to some embodiments.

Referring now to FIG. 3, an example table 300 of input sequences 130 and corresponding trigger words 340 is shown, according to some embodiments. Table 300 provides an example of trigger words that can be generated from different input sequences using a rule-based system such as trigger word extraction module 122. The generation of trigger words can be flexible, but the intention is to determine a trigger word from input sequence 130 that is indicative of the nature of the desired output response 140. For example, if input sequence 130 is "the bathroom looks great" as shown in table 300, the trigger word can be "great." As another example, if input sequence 130 is "I feel cold," the trigger word may be "cold." Additionally, if input sentence 130 is "we are out of milk," the trigger word may be "empty." Each of these trigger words provides an indication of what the nature of output response 140 should be. If the trigger word is a negative word such as "empty," "dirty," or "uncomfortable," then output response 140 may convey to the user that some type of corrective action will be taken and/or apologize for the dissatisfaction expressed by the user. If the trigger word is a positive word such as "great," "clean," or "wonderful," then output response 140 may convey satisfaction and thank the user for the positive indication.

In some embodiments, cloud computing platform 120 uses part-of-speech tagging in order to identify parts of speech associated with each word in input sequence 130. Part-of-speech tagging approaches can be implemented to determine whether each word of input sentence 130 is a noun, an adverb, a determiner, an adjective, a preposition, etc. Part-of-speech tagging can allow cloud computing platform 120 to more accurately and efficiently generate trigger words from input sequence 130. Part-of-speech tagging can consider both the dictionary definition of a word as well as take into account the context of a word within a sequence in order to determine which part of speech to assign to the word.

For example, consider a case where input sequence 130 includes keywords such as "bathroom," "toilet," "restroom," "washroom," "soap," or "toilet paper." In this case, these keywords can indicate that input sentence 130 is bathroom-related. As a result, input sequence 130 can be mapped to an adjective or adverb present in the sequence. However, if the adverb "not" or the determiner "no" is present in input sequence 130, then input sequence 130 can be mapped to the opposite of an adverb or adjective present in the sentence.

As another example, consider a case where input sequence 130 includes keywords such as "kitchen," "bathroom," "milk," "sugar," "paper towels," or "coffee." In this case, these keywords can indicate that input sequence 130 is breakroom-related. Presence of additional words such as "out" or "need" in input sequence 130 can indicate that the trigger word should be "empty," for example.

Moreover, consider a case where input sequence 130 includes keywords such as "temperature," "warm," "hot," "sweaty," "cool," "cold," "increase," "decrease," "lower," or "raise." In this case, these keywords can indicate that input sequence 130 is heating/cooling related and the trigger word can be something like "hot" or "cold." In the case where an appropriate trigger word is not readily apparent, cloud computing platform 120 can be configured to set the trigger word to "default," "null," or another similar term.

Figure 4:
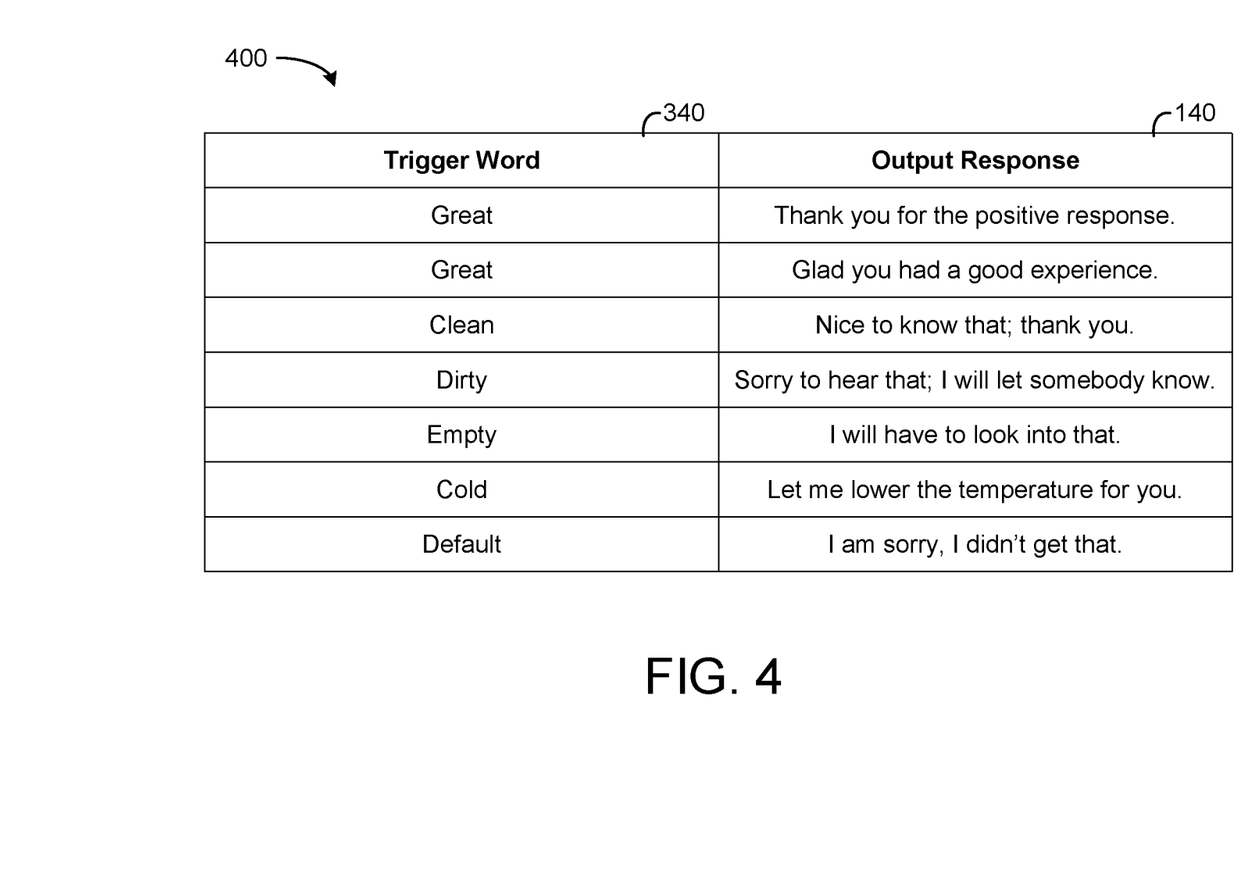
FIG. 4 is a table showing examples of trigger word—output response pairs, according to some embodiments.

Referring now to FIG. 4, an example table 400 of trigger words and output responses 140 is shown, according to some embodiments. As shown, multiple different output responses can be generated for a given trigger word. For example, if the trigger word is "great," then output response 140 can be "thank you for the positive response," "glad you had a good experience," or other similar responses. Table 400 provides an example of trigger word—output response pairs, which are discussed in more detail below.

Figure 5:
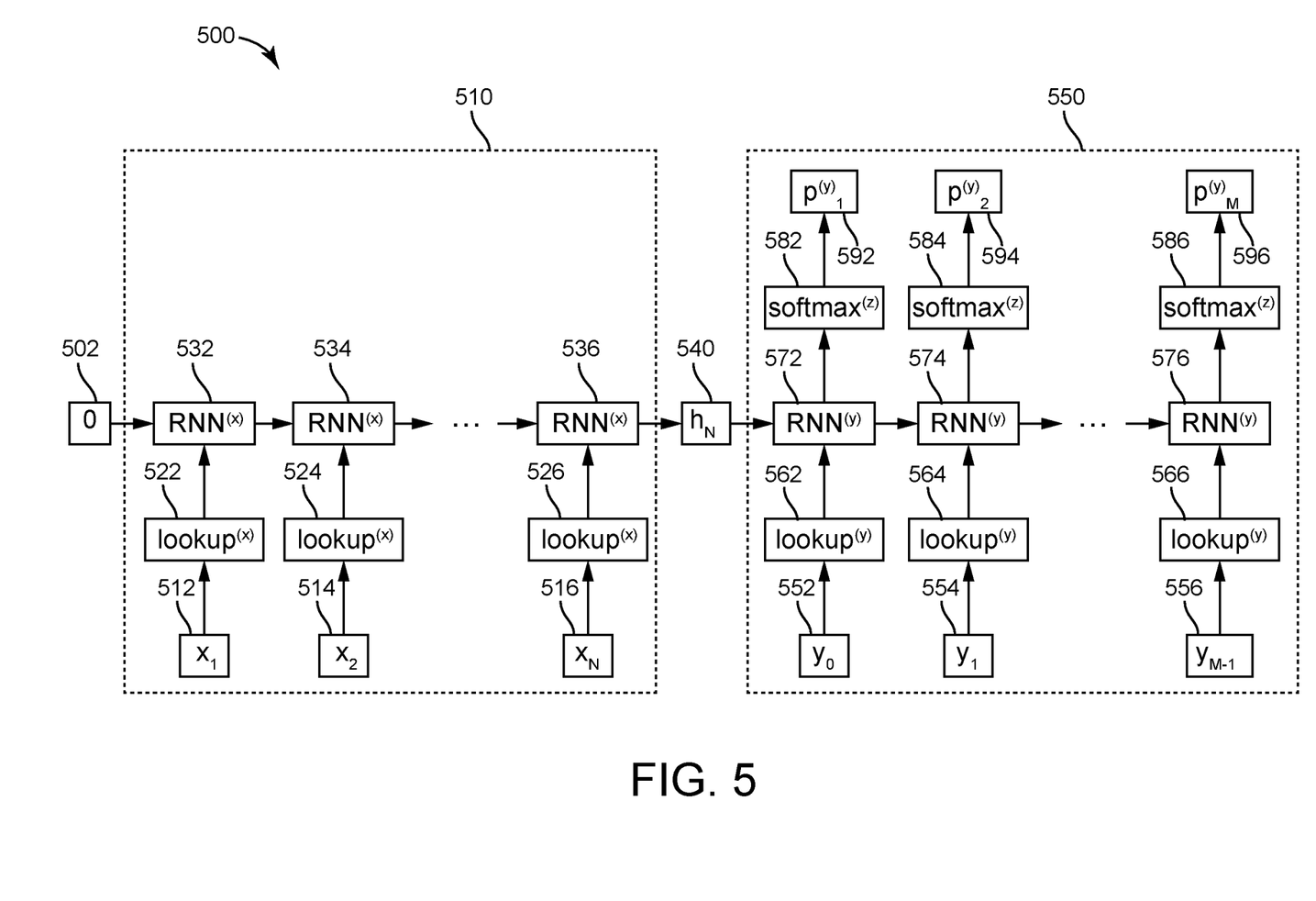
FIG. 5 is a block diagram of an example encoder-decoder neural network model, according to some embodiments.

Referring now to FIG. 5, an example diagram of an encoder-decoder recurrent neural network model 500 is shown, according to some embodiments. Network 500 provides an example of a full sequence to sequence (seq2seq) neural network model that can be implemented by entities with large amounts of training data. Network 500 is shown to include two parts: an encoder 510 and a decoder 550. Encoder 510 and decoder 550 can be thought of as two separate recurrent neural networks or a single recurrent neural network with two parts. In FIG. 5, each of these recurrent neural networks are shown in an "unrolled" or "unfolded" state (i.e. the network is written out for the complete sequence). Encoder 510 can be configured to process input sequence 130 and decoder 550 can be configured to generate output response 140. However, for entities that have an insignificant amount of training data, encoder 510 can be replaced by a rule-based natural language processing system such as trigger word extraction module 122. The description below will demonstrate how encoder 510 works as part of sequence to sequence network 500 as well as how encoder 510 can be replaced by trigger word extraction module 122.

Encoder 510 is shown to include inputs 512, 514, and 516. Each of these inputs can be generated from input sequence 130. Encoder 510 can be configured to process any length input sequence 130. In some embodiments, a speech-to-text conversion is performed on input sequence 130 using speech to text module 121. For example, if input sequence 130 is "I feel cold" as spoken by a user and detected by thermostat device 200, then input 512 could be the string "I," input 514 could be the string "feel," and input 516 could be the string "cold."

Encoder 510 is also shown to include lookup blocks 522, 524, and 526. In some embodiments, a word2vec model is used to map the input words to vectors in a vector space. However, other methods and models for word embedding can also be used. As a result, each word of input sequence 130 can be represented by a real number vector in a vector space that can consist of hundreds of dimensions. In the vector space, words that share common context can be located in close proximity to each other. In some embodiments, proximity is measured by cosine similarity within the vector space. The vector space and associated word vectors for a given input sequence 130 can provide a framework for processing via sequence to sequence network 500.

Encoder 510 is also shown to include recurrent neural network nodes 532, 534, and 536. These nodes can be configured to sequentially process each word of input sequence 130. It is important to note that these nodes are shown in an "unrolled" state and in some embodiments can be thought of as a single recurrent neural network node that processes sequential inputs received at different time steps. The sequential processing performed by these nodes can be described in part by the following equation:

$$h_t = \text{func}(W^x x_t + W^h h_{t-1})$$

In this equation, t represents a time step related to the sequential processing. For example, the first word of input sequence 130 can be represented by the term $x_t$ and the second word of input sequence 130 can be represented by the term $x_{t+1}$. Moreover, the term h represents a hidden state at each time step, the term W represents weights, and func represents an activation function. As an example, looking at node 534 as shown in FIG. 5, node 534 receives two inputs: 1) the word vector representing $x_2$, and 2) the hidden state $h_1$ from the previous time step (i.e. resulting from node 532). As shown in the equation above, each of these two inputs can be multiplied by weights $W^x$ and $W^h$, respectively. Next, the activation function can be applied to sum of the weighted inputs in order to calculate the hidden state for the current time step (i.e. $h_2$). A variety of activation functions can be selected, such as a hyperbolic tangent function or a sigmoid function. The hidden state at the final time step associated with encoder 510 (e.g. state 540) can then be used as the initial state of decoder 550.

Alternatively, input sequence 130 can be processed by trigger word extraction module 122 in order to use a trigger word to generate hidden state 540. As described above, module 122 can be implemented as a rule-based system. Processing performed by module 122 can include natural language processing functions such as part-of-speech tagging, word segmentation, parsing, sentence breaking, terminology extraction, etc. The goal is to generate a trigger word associated with input sequence 130 that is indicative of a desired output response 140. Accordingly, decoder 550 can be trained with a small set of trigger word-output response pairs in order to generate human-like responses to user inputs.

Decoder 550 is shown to include predicted words 552, 554, and 556 that can be combined to form output response 140. Decoder 550 can be configured to generate any number of predicted words to form output response 140. In some embodiments, word 552 is a start-of-sentence keyword. Similar to encoder 510, decoder 550 is shown to include lookup blocks 562, 564, and 566 that represent translating a string (e.g. predicted word) into a word vector and, in some embodiments, comparing to words in a lookup table. Decoder 550 is also shown to include recurrent neural network nodes 572, 574, and 576. It is again important to note that these nodes are shown in an "unrolled" state and can be thought of as a single recurrent neural network node that processes sequential inputs received at different time steps. Node 572 is shown to receive two inputs: 1) the word vector representing $y_0$, and 2) the hidden state $h_N$ encoding of the trigger word generated by module 122. The sequential processing performed by decoder 550 can be represented in part by the following equations:

$$h_t = \text{func}(W^y y_t + W^h h_{t-1})$$

$$z_t = W^z h_t$$

In these equations, the term t again represents a time step related to the sequential processing performed by decoder 550. Similarly, the term h represents a hidden state at each time step, the term W represents weights, and func represents an activation function. Decoder 550 also uses an output $z_t$ at each time step in order to predict the next word of output response 140. Decoder 550 can be configured to process these outputs using a softmax function (represented by blocks 582, 584, and 586) in order to determine a probability associated with the next predicted word (represented by blocks 592, 594, and 596). Ultimately, decoder 550 will produce a probability distribution of possible words that can be concatenated into output response 140. Various approaches can be used to select a particular output response 140 from this probability distribution such as random sampling or a "greedy" search. In some embodiments, a beam search is used to determine the best solution and select output response 140.

Figure 6:
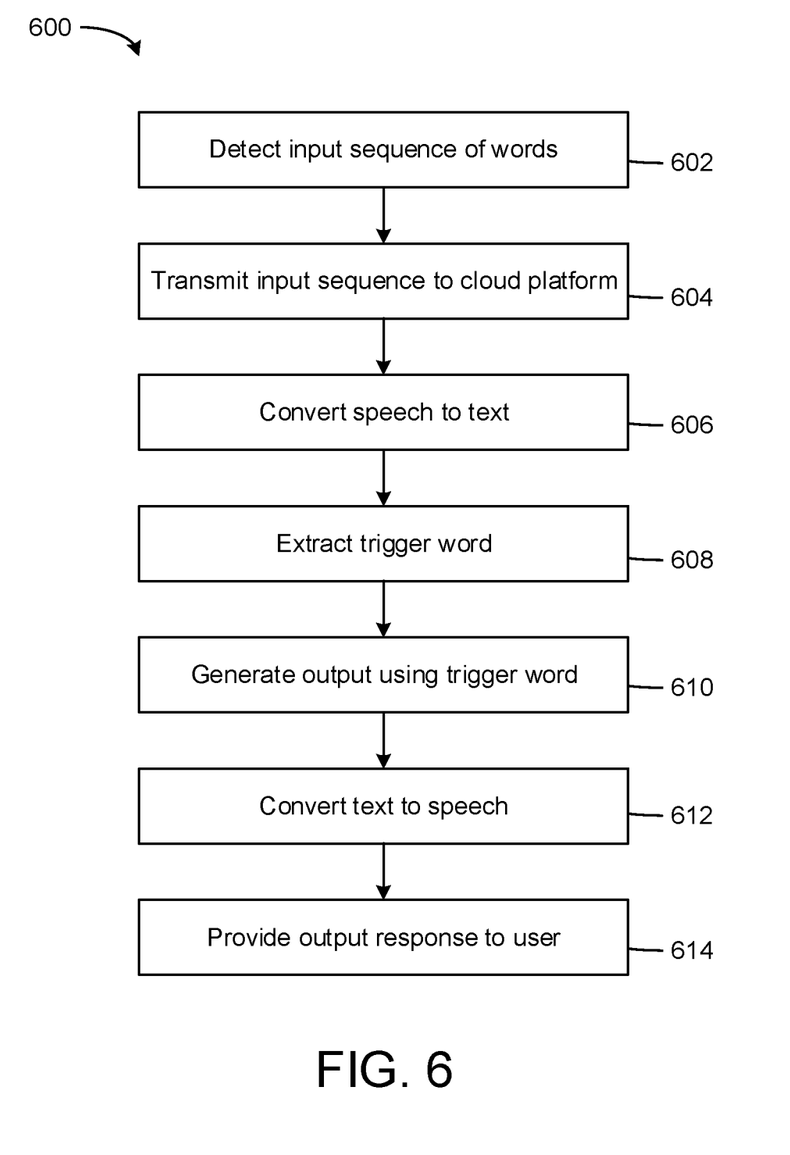
FIG. 6 is a flow diagram of an example process for generating an output response based on an input sequence of words is shown, according to some embodiments.

Referring now to FIG. 6, a process 600 for generating an output response (e.g. to be provided by a virtual assistant) based on an input sequence of words is shown, according to some embodiments. Process 600 can be performed by a system such as system 100, for example. In the example where virtual assistant 110 is implemented in smart thermostat device 200, input sequence 130 will typically be related to a building environment such as an office space or a residential space. For example, input sequence 130 may be related to temperature, air quality, or lighting. The user typically expects output response 140 to both be related to the information conveyed by the user via input sequence 130 and as human-like as possible. For example, the user may expect thermostat device 200 to provide a variety of output responses instead of hearing the same responses over and over again. Upon deployment of new voice command-enabled products or devices such as thermostat device 200, entities that produce a new device may not have a significant quantity of training data available to effectively train artificial intelligence and machine learning models such as a sequence to sequence model. Process 600 can enable the implementation of voice command functionality in such applications.

Process 600 is shown to include detecting an input sequence of words spoken by the user (step 602). For example, virtual assistant 110 may detect that the user has spoken a voice command. The voice command can be any input sequence 130 such as shown above in table 300. Process 600 is also shown to include transmitting the input sequence to a cloud computing platform (step 604). For example, after detecting a new input sequence 130, virtual assistant 110 can directly or indirectly transmit input sequence 130 to cloud computing platform 120.

Process 600 is also shown to include converting the input sequence into text (step 606). The conversion can be performed by an application or module native to cloud computing platform 120 and/or can be performed using a third-party API (e.g. IBM Watson, Microsoft Azure, Google Cloud, etc.). In some embodiments, once converted into text (e.g. a string or string array), each word of input sequence 130 is translated into a word vector in a vector space (e.g. a numerical representation). The vector transformation can be performed using a lookup using models such as word2vec, for example.

Process 600 is also shown to include extracting a trigger word from the input sequence (step 608). The trigger word is representative of the desired nature of output response 140. For example, the trigger word may be any of trigger words 340 as discussed above and shown in tables 300 and 400. The trigger word extraction can be performed by a rule-based system such as trigger word extraction module 122. In some embodiments, part-of-speech tagging is used to help determine which words of input sequence 130 are most significant and what an appropriate trigger word may be. Various words in input sequence 130 may also be compared to a set of predetermined trigger words stored in a lookup table. For example, if a word within input sequence 130 is close to a word vectors in the lookup table in the vector space, then nodule 122 can determine that such a word should be the trigger word. In some embodiments, the trigger word is embedded in a hidden state of a recurrent neural network (e.g. hidden state 540).

Process 600 is also shown to include generating an output response based on the trigger word (step 610). In some embodiments, step 610 is performed by a recurrent neural network such as decoder 550. The recurrent neural network can use a trigger word vector (e.g. initial state as state 540) as an input in order to generate an appropriate output response 140. If the network is trained with a small set of trigger word input—output response pairs, then the network can make fairly accurate predictions about what output response 140 should be given any variable trigger word. For example, if the network has been trained to generate a sequence of word vectors in response to a trigger word, then the network can generate output response 140 using word vectors that are in close proximity to this sequence in the vector space. In some embodiments, the output of the network is a probability distribution of possible words that can be used to form output response 140. A beam search or other type of graph exploration technique can be used to select output response 140 from this probability distribution.

Process 600 is also shown to include converting the output response into speech (step 612). Similar to step 606, step 612 may be performed by performed by an application or module native to cloud computing platform 120 and/or can be performed using a third-party API (e.g. IBM Watson, Microsoft Azure, Google Cloud, etc.). The "speech" can be data in any format that can be recognized by virtual assistant 110 in order to transmit a human-like response to the user. Finally, process 600 is also shown to include providing the output response to the user (step 614). For example, virtual assistant 110 can transmit output response 140 to the user via speakers of thermostat device 200.

Figure 7:
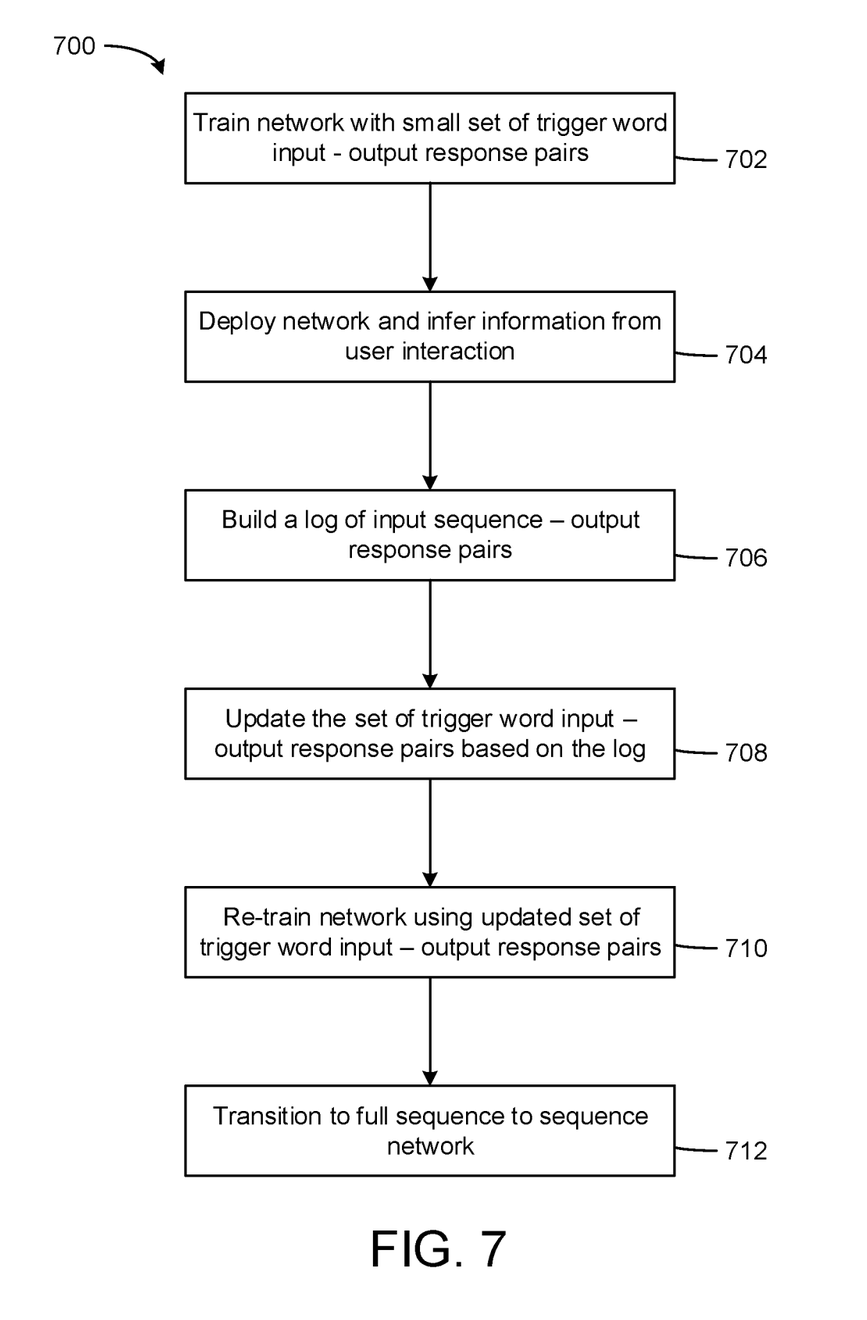
FIG. 7 is flow diagram of an example process for implementing a neural network for language processing with minimal training data, according to some embodiments.

Referring now to FIG. 7, a process 700 for implementing a neural network for language processing with minimal training data is shown, according to some embodiments. Upon deployment of new products or devices such as thermostat device 200, the entity that produces the device may not have a significant quantity of training data available to effectively train advanced artificial intelligence and machine learning models as desired. As such, the entity may not be able to implement a full sequence to sequence learning model in the initial release of a new device. Process 700 allows such entities to deploy a reasonable language processing model with minimal training data upon initial release, gather training data over time, and ultimately transition to a more advanced model such as a sequence to sequence model.

Process 700 is shown to include training a neural network using a small set of trigger word input-output response pairs (step 702). For example, decoder 550 can be trained with trigger word input-output response pairs as shown in table 400. Training decoder 550 in this manner allows decoder 550 to "learn" which output responses should be generated for a given trigger word. For example, decoder 550 can apply weights and generate predicted words based on the trigger word input-output response pairs it has been trained with. The ability to train decoder 550 in this manner enables implementation of a reasonable language processing system with minimal training data. For example, such a system may be trained with only tens of trigger word input-output response pairs and still generate reasonable outputs.

Process 700 is also shown to include deploying the neural network and inferring additional information based on user interaction (step 704). For example, as more users purchase and use thermostat device 200, decoder 550 is exposed to more input sequences and produces more output responses. Accordingly, decoder 550 can "learn" more trigger words and output responses. After this deployment and inference step 704, process 700 is shown to include building a log of input sequence-output response pairs (step 706). For example, cloud computing platform 120 can be configured to store input sequence-trigger word pairs as processed by trigger word extraction module 122 and map these input sequences to corresponding output responses generated by decoder 550 using the respective trigger word.

This log of input sequence-output response pairs can provide valuable information such that a stakeholder or other personnel associated with thermostat device 200 can determine the most common input sequences as well as the most common output responses. It should be noted that cloud computing platform 120 can be configured to anonymize data in various ways (e.g. aggregating, removing personally identifiable information, etc.) such that user privacy is protected. Moreover, cloud computing platform 120 can provide users with an option to "opt-in" to such services. If the user "opts-out," then cloud computing platform 120 can be configured not to store any data associated with that user's device.

Process 700 is also shown to include updating the set of trigger word input-output response pairs based on the log of input sequence-output response pairs (step 708). The log of input sequence-output response pairs can be analyzed in order to determine any additional trigger words that should be used to train decoder 550, for example. Moreover, the log of input sequence-output response pairs can be used to determine additional output responses that can be associated with trigger words. After the set of trigger word input-output response pairs has been updated, decoder 550 can be re-trained (step 710).

Process 700 is also shown to include transitioning to a full sequence to sequence network model once the log of input sequence-output response pairs is sufficient (step 712). Once enough training data is gathered, a full sequence to sequence encoder-decoder neural network can be implemented via cloud computing platform 120. For example, instead of using rule-based processing performed by trigger word extraction module 122, a transition can be made to process input sequence 130 using encoder 510. This type of network can deliver more desirable results, however it may not work well unless sufficient training data is available. The systems and methods described herein allow for transition to such a network over time.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for generating a human-like response to a voice or text input, the method comprising:
    receiving an input sequence of words;
    processing, by an extraction module, the input sequence of words to generate a trigger word that is indicative of a desired nature of the human-like response, the extraction module comprising a computer-readable storage medium having instructions stored thereon that are executable by a processor;
    encoding, by the extraction module, a state of a neural network using the trigger word by inputting information into the state before an encoder is trained to output the state;
    generating the human-like response using an output word sequence of the neural network, the output word sequence generated by the neural network by decoding the output word sequence from the state of the neural network encoded using the trigger word; and
    switching from encoding the state with the extraction module to encoding the state of the neural network with the encoder once the encoder is trained to a particular level.

2. The method of claim 1, further comprising training the neural network with a set of pairs, each pair of the set of pairs comprising one trigger word and one human-like response.

3. The method of claim 2, further comprising building a log of input sequences and associated human-like responses after deployment of the neural network.

4. The method of claim 3, further comprising updating the set of pairs using the log and re-training the neural network using the set of pairs.

5. The method of claim 1, wherein encoding the neural network using the trigger word comprises setting the state of the neural network to a word vector representation of the trigger word, wherein the state is a hidden state.

6. The method of claim 1, wherein processing the input sequence of words to generate the trigger word comprises performing a part-of-speech tagging process associated with the input sequence of words.

7. The method of claim 1, wherein processing the input sequence of words to generate the trigger word comprises comparing one or more words of the input sequence of words to previously generated trigger words.

8. The method of claim 1, wherein the output word sequence of the neural network is a probability of a next word given at least one previously predicted word of the human-like response.

9. The method of claim 8, wherein generating the human-like response using the output word sequence of the neural network comprises using a beam search.

10. The method of claim 1, further comprising transmitting the human-like response to a device configured to provide the human-like response to a human.

11. The method claim 1, wherein the method further comprises:
    switching, after an amount of time, to encoding the state of the neural network with the encoder.

12. A system comprising:
    a cloud computing platform; and
    a device with an integrated virtual assistant, the device in communication with the cloud computing platform, the device comprising a computer-readable storage medium having instructions stored thereon that are executable by a processor of the device and configured to implement an extraction module, the device configured to:
        receive an input sequence of words spoken by a human;
        transmit the input sequence of words to the cloud computing platform, the cloud computing platform configured to:
            extract, by the extraction module, a trigger word from the input sequence of words that is indicative of a desired nature of an output response to be transmitted to the human;
            encode, by the extraction module, a state of a neural network using the trigger word by inputting information into the state before an encoder is trained to output the state;
            generate the output response using an output word sequence of the neural network, the output word sequence generated by the neural network by decoding the output word sequence from the state of the neural network encoded using the trigger word; and
            switch from encoding the state with the extraction module to encoding the state of the neural network with the encoder once the encoder is trained to a particular level;
        receive the output response from the cloud computing platform; and
        provide the output response to the human.

13. The system of claim 12, wherein the device is a thermostat, a speaker, a smartphone, a tablet, a watch, a personal computer, or a laptop.

14. The system of claim 12, wherein the cloud computing platform is further configured to perform a part-of-speech tagging process associated with the input sequence of words.

15. The system of claim 12, wherein the neural network is trained with a set of pairs, each pair of the set of pairs comprising one trigger word and one output response.

16. The system of claim 15, wherein the cloud computing platform is configured to build a log of input sequences and associated output responses after deployment of the neural network, update the set of pairs using the log, and re-train the neural network using the set of pairs.

17. A method for providing a response to a speech input, the method comprising:
    receiving, by a device with an integrated virtual assistant, the speech input from a human;
    transmitting, by the device, the speech input to a cloud computing platform;
    extracting, by an extraction module of the cloud computing platform, a trigger word from the speech input that is indicative of a desired nature of the response, the extraction module comprising a computer-readable storage medium having instructions stored thereon that are executable by a processor;

encoding, by the extraction module of the cloud computing platform, a state of a neural network using the trigger word by inputting information into the state before an encoder is trained to output the state;

generating, by the cloud computing platform, a word sequence response using the neural network, the word sequence response generated by the neural network by decoding the word sequence response from the state of the neural network encoded using the trigger word;

receiving, by the device, the response from the cloud computing platform;

providing, by the device, the response to the human; and switching, by the cloud computing platform, from encoding the state with the extraction module to encoding the state of the neural network with the encoder once the encoder is trained to a particular level.

18. The method of claim 17, further comprising training the neural network with a set of pairs, each pair of the set of pairs comprising one trigger word and one response.

19. The method of claim 17, wherein extracting the trigger word from the speech input comprises performing a part-of-speech tagging process associated with the speech input.

20. The method of claim 17, wherein extracting the trigger word from the speech input comprises comparing one or more words of the speech input to previously generated trigger words.

21. The method of claim 17, wherein providing the trigger word as an input to the neural network comprises setting the state of the neural network to a word vector representation of the trigger word, wherein the state of the neural network is a hidden state.

\* \* \* \* \*